3,490,874
COLORIMETRIC METHOD FOR THE QUANTITATIVE DETERMINATION OF OXALACETIC ACID
Sohachi Ando and Yoko Fukushima, Tokyo, Japan, assignors to Chugai Seiyaku Kabushiki Kaisha, Tokyo, Japan, a corporation of Japan
No Drawing. Filed Mar. 24, 1967, Ser. No. 625,605
Claims priority, application Japan, Apr. 4, 1966, 41/20,676
Int. Cl. G01n $21/20, 33/00$
U.S. Cl. 23—230  6 Claims

ABSTRACT OF THE DISCLOSURE

A method for the determination of oxalacetic acid wherein a colorimetric determination of oxalacetic acid using a diazonium salt or a metallic double salt thereof is compared with a standard using aspartic acid or a salt thereof with the same diazonium salt.

---

This invention relates to a method for determination of oxalacetic acid and a reagent kit for accomplishing this method, and more particularly relates to the use of aspartic acid or a salt thereof as the standard substance in the colorimetric determining method of oxalacetic acid using diazonium salt or a metallic double salt thereof.

Recently, a method for determination of oxalacetic acid using a diazonium salt, which strongly reacts with oxalacetic acid to form a color, has been proposed. The method is as follows: oxalacetic acid is determined by comparing the depth of the color of a sample, which has been developed by the reaction between a diazonium salt and oxalacetic acid, with that of the standard solution of oxalacetic acid, which has been developed in the same manner as in the sample. However, oxalacetic acid is so unstable that decomposition begins to occur immediately after dissolving in water and further, it is so hygroscopic that it is difficult to weigh it exactly. Accordingly, it is very difficult to obtain the standard solution of oxalacetic acid and it is unfavorable to use oxalacetic acid as the standard substance.

It is an object of the present invention to provide a novel process which overcomes the disadvantages enumerated above for the previous process.

It has now been found that aspartic acid or a metallic salt thereof can be suitably used as the standard substance. That is, a color reaction occurs when a diazonium salt solution is added to an aspartic acid solution, which is prepared by dissolving aspartic acid or the salt thereof in a buffer solution having a pH of 6.5–8.5, and the color thus formed has similar properties to that which is developed by the reaction between oxalacetic acid and diazonium salt. The formed color is insoluble in an acidic solution but soluble in ethanol, and it gives almost the same absorption spectrum as that which is developed by the reaction between oxalacetic acid and diazonium salt. For example, the color gives a maximum absorption of near 530 m$\mu$ in a neutral or weak alkaline state and at near 470 m$\mu$ in an acidic state when 6-benzamido-4-methoxy-m-toluidine diazonium chloride is used as the diazonium salt.

Aspartic acid is one of the acidic amino acids and widely exists in nature, and is so stable that decomposition hardly occurs when the solution is kept in an aqueous solution, as contrasted with the instability of oxalacetic acid. Further, the depth of the color increase with the increase of the concentration of aspartic acid in the reaction mixture when treated with diazonium salt, and the exact standard curve of the color reaction with diazonium salt may be obtained advantageously using aspartic acid when it is required, and the content of oxalacetic acid may be determined exactly, as contrasted with the case using the very unstable oxalacetic acid as the standard.

In carrying out the present invention, L- or D,L-aspartic acid, or a metallic salt thereof may be used as the aspartic acid or the salt thereof and 6-benzamido-4-methoxy-m-toluidine diazonium chloride or the double salt of zinc chloride thereof, 4-amino-2,5-diethoxy benzanilido diazonium chloride may be used as the diazonium salt or the metallic double salt thereof.

The color reaction is preferably carried out at a pH of 6.5–8.5 by the addition of buffer solution. The reaction is stopped by the addition of an acid such as acetic acid, trichloracetic acid, hydrochloric acid, sulfuric acid or the like and an alcohol such as ethanol or methanol.

The standard curve may be obtained by measuring the absorption of the color, which is formed by the reaction between aspartic acid or the metallic salt thereof and diazonium salt or the metallic double salt thereof, and the amount of oxalacetic acid may be determined by measuring the absorption of oxalacetic acid under the same conditions.

The methods of the present invention may be used not only in the colorimetric determination of oxalacetic acid, but also in the determination of oxalacetic acid in the body fluid or tissue extract, in the determination of enzymic activity, e.g. the determination of the activity of glutamic-oxalaectic transaminase which forms oxalacetic acid as the result of the enzymic reaction and in the determination of the activity of the enzyme such as glutamic-pyruvic transaminase, glutamic-p-hydroxyphenyl pyruvic transaminase, glutamic-glyoxillic transaminase, lactic dehydrogenase, $\alpha$-hydroxybutyrate dehydrogenase, alcohol dehydrogenase and glutamic dehydrogenase, by coupling the enzymic reaction which forms oxalacetic acid, and measuring the formed oxalacetic acid.

Suitable novel reagent kits described hereafter adapted for use in connection with the above methods are also considered to be a part of the present invention.

The following examples are illustrative only and should not be construed as limiting the scope of the invention.

EXAMPLE 1

0.5 ml. of aqueous solution of double salt of 6-benzamido-4-methoxy-m-toluidine diazonium chloride and zinc chloride (10 mg./ml.) was added to 2.0 ml. of 0.05-M, pH 8.0, borate buffer solution containing 135 $\mu$moles of L-aspartic acid and the mixture was incubated at 37° C. for 10 minutes. Then, 0.4 ml. of 25%-trichloracetic acid and 4.0 ml. of ethanol were added thereto and the absorption was measured at 470 m$\mu$. The value was 0.370. This corresponds to the absorption of 0.6 $\mu$moles of oxalacetic acid.

Accordingly, the concentration of oxalacetic acid Y ($\mu$moles) in a sample may be calculated by the following equation:

$$Y = \frac{\text{absorption value (sample)} \times 0.6}{0.370}$$

1 ml. of 0.05-M, pH 8.0, borate buffer solution was added to 1 ml. of a sample and 0.5 ml. of aqueous solution of the double salt of 6-benzamido-4-methoxy-m-toluidine diazonium chloride and zinc chloride (10 mg./ml.) was added thereto. After the mixture was incubated at 37° C. for 10 minutes, 0.4 ml. of 25%-trichloracetic acid and 4.0 ml. of 95%-ethanol were added to the mixture and the absorption was measured at 470 m$\mu$. The value was 0.185.

Accordingly, the concentration of oxalacetic acid was determined by the following calculation:

$$\frac{0.185 \times 0.6}{0.370} = 0.3 \text{ (}\mu\text{moles)}$$

The same spectrophotometer was used both in the sample and the "blank." When a different spectrophotometer is used in both cases, the concentration of oxalacetic acid is calculated by the following equation:

$$Y(\mu\text{moles}) = \frac{\text{adsorption value (sample)} \times 0.6}{\text{absorption value (135 }\mu\text{moles, L-aspartic acid)}}$$

owing to the difference of the absorption.

EXAMPLE 2

The following is a general method for determination of oxalacetic acid using a reagent kit in accordance with this invention.

Reagent kit (A) Aspartic acid solution: 0.05-M, pH 8.0, borate buffer solution containing L-aspartic acid (67.5 $\mu$moles/ml.)
(B) Diazonium salt solution: Aqueous solution of the double salt of 6-benzamido-4-methoxy-m-toluidine diazonium chloride and zinc chloride (10 mg./ml.)
(C) 25%-aqueous trichloracetic acid solution
(D) 95%-ethanol
(E) 0.05-M, pH 8.0, borate buffer solution.

Use

First, add 0.5 ml. of preparation B to 2.0 ml. of preparation A and incubate the mixture at 37° C. for 10 minutes. Then, add 0.4 ml. of preparation C and 4.0 ml. of preparation D to the mixture and measure the absorption at 470 m$\mu$ by a spectrophotometer (absorption value: $a$).

Next, add 1 ml. of preparation E and 0.5 ml. of preparation B to 1 ml. of a sample and treat the mixture in the same manner as described above (absorption value: $b$).

The amount of oxalacetic acid may be calculated by the following equation:

$$X(\mu\text{moles}) = \frac{b \times 0.6}{a}$$

EXAMPLE 3

0.1-M, pH 7.4, L-aspartic acid solution was prepared by dissolving L-aspartic acid in 0.1-M, phosphate buffer solution and to 2.0 ml. of the solution was added 0.4 ml. of aqueous solution of double salt of 6-benzamido-4-methoxy-m-toluidine diazonium chloride and zinc chloride (10 mg./ml.).

After the incubation at 37° C. for 10 minutes, 0.4 ml. of 25%-trichloracetic acid and 4.0 ml. of ethanol were added thereto and the absorption was measured at 470 m$\mu$. The value was 0.540. It corresponds to the absorption of 304 units of glutamic-oxalacetic transaminase activity.

Accordingly, the enzymic activity X (Karmen units) of glutamic-oxalacetic transaminase in the sample may be calculated by the following equations:

$$X = \frac{\text{absorption value (sample)} \times 304}{0.540}$$

Enzymic activity of glutamic-oxalacetic transaminase in a serum may be determined by using the above equation as follows:

To a mixture of 10 $\mu$moles of $\alpha$-keto-glutaric acid and 100 $\mu$moles of L-aspartic acid was added 0.1-M, pH 7.4, tris-HCl buffer solution to make the volume 2 ml. and 0.2 ml. of serum was added thereto.

After the incubation at 37° C. for 5 minutes, 4.0 ml. of ethanol and 0.2 ml. of aqueous solution of 6-benzamido-4-methoxy-m-toluidine-diazonium chloride (10 mg./ml.) were added and the mixture was further incubated at 37° C. for 5 minutes. Then, 0.4 ml. of 25%-trichloracetic acid was added thereto and the absorption was measured at 470 m$\mu$. The value was 0.177.

Accordingly, the activity of glutamic-oxalacetic transaminase was determined to be 99.6 (Karmen units) by the following calculation:

$$\frac{0.177 \times 304}{0.540} = 99.6 \text{ (Karmen units)}$$

The same spectrophotometer was used in the sample and the "blank." When a different spectrophotometer is used in both cases, the activity may be calculated according to the following equation:

$$X \text{ (Karmen units)} = \frac{\text{absorption value (sample)} \times 304}{\text{absorption value (200 }\mu\text{moles, L-aspartic acid)}}$$

owing to the difference of the absorption.

EXAMPLE 4

The following is a general method for the determination of glutamic-oxalacetic transaminase using a reagent kit for this purpose.

Reagent kit (A) Aspartic acid solution: 0.1-M, pH 7.4, phosphate buffer solution containing L-aspartic acid (100 $\mu$moles/ml.)
(B) Substrate solution: 0.1-M, pH 7.4, phosphate buffer solution containing $\alpha$-ketoglutaric acid (5 $\mu$moles/ml.) and L-aspartic acid (50 $\mu$moles/ml.)
(C) Diazonium salt solution: Aqueous solution of the double salt of 6-benzamido-4-methoxy-m-toluidine diazonium chloride and zinc chloride (10 mg./ml.)
(D) 25%-aqueous trichloracetic acid solution
(E) 95%-ethanol.

Use

At first, add 0.4 ml. of preparation C to 2 ml. of preparation A and incubate the mixture at 37° C. for 10 minutes. Then, add 0.4 ml. of preparation D and 4.0 ml. of preparation E to the mixture and measure the absorption at 470 m$\mu$ by a spectrophotometer (absorption value: $a$)

Next, add 2 ml. of preparation B to 0.2 ml. of a sample and incubate the mixture at 37° C. for 5 minutes. Then add 4.0 ml. of preparation E and 0.2 ml. of preparation C to the mixture and incubate the mixture again at 37° C. for 5 minutes, and then add 0.4 ml. of preparation D to the mixture and measure the absorption at 470 m$\mu$ by a spectrophotometer (absorption value: $b$)

The activity of glutamic-oxalacetic transaminase may be calculated by the following equation:

$$X \text{ (Karmen units)} = \frac{b \times 304}{a}$$

EXAMPLE 5

The following is a general method for the determination of glutamic-pyruvic transaminase using a reagent kit adapted to this purpose.

Reagent kit (A) Aspartic acid solution: 0.1-M, pH 7.4, phosphate buffer solution containing D,L-aspartic acid (100 $\mu$moles/ml.)
(B) Substrate solution: 0.1-M, pH 7.4, tris-HCl buffer solution containing L-glutamic acid (20 $\mu$moles/ml.), L-aspartic acid (150 $\mu$moles/ml.) and pyruvic acid (10 $\mu$moles/ml.)
(C) Glutamic-oxalacetic transaminase solution: Aqueous solution (pH 7.4) containing glutamic-oxalacetic transaminase (10 I.U./ml.) and pyridoxal-5'-phosphate (50 $\mu$g./ml.)
(D) Diazonium salt solution: Aqueous solution of the double salt of 6-benzamido-4-methoxy-m-toluidine diazonium chloride and zinc chloride (10 mg./ml.)
(E) 25%-aqueous trichloracetic acid solution
(F) 95%-ethanol.

Use

The absorption at 470 mμ is measured colorimetrically by the same manner as in Example 4 (absorption value: $a$).

Next, add 0.2 ml. of a sample to the mixture of 1.0 ml. of preparation B and 0.8 ml. of preparation C and incubate the mixture at 37° C. for 10 minutes. Then, add 4.0 ml. of preparation F and 0.2 ml. of preparation D to the mixture and incubate the mixture again at 37° C. for 10 minutes. After addition of 0.5 ml. of preparation E, measure the absorption at 470 mμ by a spectrophotometer (absorption value: $b$).

The activity of glutamic-pyruvic transaminase X may be calculated by the following equation:

$$X \text{ (Karmen units)} = \frac{b \times 490}{a}$$

EXAMPLE 6

The following is a general method for the determination of lactic dehydrogenase using a reagent kit adapted to this purpose.

Reagent kit (A) Aspartic acid solution: 0.1-M, ph 7.4, phosphate buffer solution containing L-aspartic acid (100 μmoles/ml.)
(B) Substrate solution: 0.1-M, pH 8.75, tris-HCl buffer solution containing 1-malic acid (100 μmoles/ml.) and pyruvic acid (40 μmoles/ml.)
(C) Malic dehydrogenase solution: Aqueous solution containing malic dehydrogenase (10 I.U./0.8 ml.) and the reduced nicotinamide adenine dinucleotide (100 μg./0.8 ml.)
(D) Diazonium salt solution: Aqueous solution of the double salt of 6-benzamido-4-methoxy-m-toluidine diazonium chloride and zinc chloride (10 mg./ml.)
(E) 25% aqueous trichloracetic acid solution
(F) 95%-ethanol.

Use

The absorption at 470 mμ is measured colorimetrically by the same manner as in Example 4 (absorption value: $a$).

Next, add 0.2 ml. of a sample to the mixture of 1.0 ml. of preparation B and 0.8 ml. of preparation C and incubate the mixture at 37° C. for 10 minutes. Then, add 4.0 ml. of preparation F and 0.2 ml. of preparation D to the mixture and incubate the mixture again at 37° C. for 10 minutes.

After addition of 0.5 ml. of preparation E, measure the absorption at 470 mμ by a spectrophotometer (absorption value: $b$).

The activity of lactic dehydrogenate may be calculated by the following equation:

$$X \text{ (Wrobleski units)} = \frac{b \times 420}{a}$$

It will be obvious to those skilled in the art that various changes may be made without departing from the spirit of the invention and therefore the invention is not limited to what is described in the specification, but only as indicated in the appended claims.

What is claimed is:

1. A colorimetric method for the quantitative determination of oxalacetic acid comprising comparing the color obtained by treatment of the oxalacetic acid-containing sample by a diazonium salt or a metallic double salt thereof, with the color obtained by treatment of a standard solution of aspartic acid or a salt thereof by said diazonium salt or a metallic double salt thereof.
2. The method of claim 1 wherein the aspartic acid is L-aspartic acid.
3. The method of claim 1 wherein the aspartic acid is D,L-aspartic acid.
4. The method of claim 1 wherein a metallic salt of aspartic acid is used.
5. The method of claim 1 wherein the diazonium salt is 6-benzamido-4-methoxy-m-toluidine diazonium chloride.
6. The method of claim 1 wherein the double salt of 6-benzamido-4-methoxy-m-toluidine diazonium chloride and zinc chloride is used.

References Cited

UNITED STATES PATENTS 3,206,376   9/1965   Babson _____ 195—103.5

JOSEPH SCOVRONEK, Primary Examiner

S. MARANTZ, Assistant Examiner

U.S. Cl. X.R.
195—103.5